(12) United States Patent
Ruetz et al.

(10) Patent No.: US 11,179,810 B2
(45) Date of Patent: Nov. 23, 2021

(54) METHODS AND MACHINE TOOLS FOR MACHINE-CUTTING WORKPIECES IN PLATE FORM OR BAR FORM

(71) Applicant: TRUMPF Werkzeugmaschinen GmbH + Co. KG, Ditzingen (DE)

(72) Inventors: Karsten Ruetz, Ludwigsburg (DE); Norbert Beier, Eberdingen (DE); Juergen Hohenadel, Schwieberdingen (DE); Simon Reinwald, Calw-Hirsau (DE); Florian Jarsch, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 407 days.

(21) Appl. No.: 16/148,322

(22) Filed: Oct. 1, 2018

(65) Prior Publication Data

US 2019/0030649 A1    Jan. 31, 2019

Related U.S. Application Data

(63) Continuation of application No. PCT/EP2017/055388, filed on Mar. 8, 2017.

(30) Foreign Application Priority Data

Apr. 4, 2016    (DE) .......................... 102016106067.4

(51) Int. Cl.
*B23K 26/384*    (2014.01)
*B21J 5/06*    (2006.01)
(Continued)

(52) U.S. Cl.
CPC .......... *B23K 26/384* (2015.10); *B21C 37/298* (2013.01); *B21J 5/066* (2013.01);
(Continued)

(58) Field of Classification Search
CPC .............. B23K 26/384; B23K 26/0093; B21C 37/298; B21J 5/066
See application file for complete search history.

(56) References Cited

U.S. PATENT DOCUMENTS 3,429,171 A * 2/1969 Feher ..................... B21D 31/02
                                                    72/325
4,177,659 A * 12/1979 van Geffen .............. B21J 5/066
                                                    72/71
(Continued)

FOREIGN PATENT DOCUMENTS

DE    196 34 417    3/1998
DE    19634417 A1 *  3/1998    .............. B23P 11/00
(Continued)

OTHER PUBLICATIONS

International Preliminary Report on Patentability in International Application No. PCT/EP2017/055388, dated Oct. 18, 2018, 7 pages (English translation).
(Continued)

*Primary Examiner* — John J Norton
(74) *Attorney, Agent, or Firm* — Fish & Richardson P.C.

(57) ABSTRACT

The disclosure relates to systems and methods for machine-cutting workpieces in plate form or bar form and also to a machine tool, with a laser machining device, and a workpiece support, by which a workpiece to be machined in the laser machining device is received, and with a workpiece moving device, by which the workpiece to be machined is held and moved in relation to the laser machining device, wherein with a machining head a laser beam is directed onto the workpiece to be machined and a clearance or recess is introduced into the workpiece and the clearance is machined with a flow drill and widened to a final size of a borehole.

8 Claims, 4 Drawing Sheets

(51) Int. Cl.
- *B23K 37/053* (2006.01)
- *B23K 26/08* (2014.01)
- *B21C 37/29* (2006.01)
- *B23K 37/047* (2006.01)
- *B23K 26/00* (2014.01)
- *B23K 101/06* (2006.01)
- *B23K 101/18* (2006.01)

(52) U.S. Cl.
CPC ........ *B23K 26/0093* (2013.01); *B23K 26/083* (2013.01); *B23K 26/0823* (2013.01); *B23K 37/047* (2013.01); *B23K 37/0538* (2013.01); *B23K 2101/06* (2018.08); *B23K 2101/18* (2018.08)

(56) References Cited

U.S. PATENT DOCUMENTS

| | | | | |
|---|---|---|---|---|
| 4,185,486 A | * | 1/1980 | van Geffen | B21J 5/066 72/71 |
| 2010/0264121 A1 | * | 10/2010 | Dilger | B23Q 1/763 219/121.67 |
| 2011/0198321 A1 | | 8/2011 | Walter et al. | |
| 2014/0290453 A1 | | 10/2014 | Buettner et al. | |
| 2018/0200772 A1 | * | 7/2018 | Nitta | B21D 19/08 |

FOREIGN PATENT DOCUMENTS

| | | |
|---|---|---|
| DE | 198 11 569 | 9/1999 |
| DE | 10 2007 051 408 | 5/2009 |
| DE | 10 2013 111 186 | 4/2014 |
| DE | 10 2013 103 121 | 10/2014 |
| EP | 2 017 023 | 1/2009 |
| JP | S 57-044204 | 3/1982 |
| JP | H 04-288987 | 10/1992 |
| JP | 2012166391 | 9/2012 |

OTHER PUBLICATIONS

International Search Report and Written Opinion in International Application No. PCT/EP2017/055388, dated May 23, 2017, 17 pages (with English translation).

KR Office Action in Korean Appln. No. 10-2018-7029766, dated Jan. 20, 2021, 8 pages (with English translation).

\* cited by examiner

METHODS AND MACHINE TOOLS FOR MACHINE-CUTTING WORKPIECES IN PLATE FORM OR BAR FORM

CROSS REFERENCE TO RELATED APPLICATIONS

This application is a continuation of and claims priority under 35 U.S.C. § 120 from PCT Application No. PCT/EP2017/055388 filed on Mar. 8, 2017, which claims priority from German Application No. DE 10 2016 106 067.4, filed on Apr. 4, 2016. The entire contents of each of these priority applications are incorporated herein by reference.

TECHNICAL FIELD

The invention relates to methods for the cutting processing of plate-shape or rod-shaped workpieces in a processing machine and a processing machine for carrying out the method.

BACKGROUND

EP 2 017 023 discloses a processing machine provided for processing rod-shaped workpieces, in particular tubes. This processing machine is a laser tube-cutting machine. The rod-like workpieces are received via a workpiece support, which is formed as a rolling support. A workpiece movement device guides the rod-like workpiece to a feed-through chuck and through it, such that a workpiece processing using a laser processing device takes place on an opposite side of the feed-through chuck. After processing the workpiece with a laser beam, it is cut off and transferred into an unloading device.

DE 10 2013 103 121 discloses a processing machine for processing plate-shaped workpieces using a laser processing device. This processing machine has a flat workpiece rest for the workpiece support of the plate-shaped material. Above the plate-shaped material, the laser processing device is provided, which has a punching head and a laser processing head to carry out a laser and/or punching processing on the plate-shaped workpiece.

For introducing a thread into rod-shaped workpieces, in particular tubular workpieces, as well as plate-shaped workpieces with a high degree of precision, it is necessary for a precise borehole to be introduced. Furthermore, it is often disadvantageous when introducing a borehole by means of a spiral drill introduces chips, as a result of the machining processing.

As a result of the introduction of a borehole by means of a flow drill, the production of a precise borehole is possible; however, because of the high axial forces when a conical tip of the flow drill penetrates into the wall of the tubular workpiece or the plate-shaped material, a high supporting force is required, which counteracts the axial force during the forcible penetration of the flow drill into the workpiece.

SUMMARY

The present disclosure relates to systems and methods for the cutting processing of plate-shaped or rod-shaped workpieces and a processing machine for producing a borehole with a high degree of precision and reduced axial force.

In a first aspect, this disclosure provides methods for processing plate-shaped or rod-shaped workpieces in which a laser beam is directed towards a workpiece to be processed via a processing head of a laser processing device and a recess is introduced into the workpiece. In these methods, the recess is subsequently widened with a flow drill to a final dimension of a borehole. These methods have the advantage that a defined positional accuracy for the borehole to be produced is made possible by the laser-cut recess. In addition, the process force or the axial force, which acts on the plate-shaped or tubular material when widening the recess to a final dimension of the borehole, is considerably reduced, since a recess has already been introduced. Furthermore, the previous introduction of a recess into the workpiece and the subsequent flow drilling has the advantage that a burr is reduced to a small amount when flow drilling, for example, to a few tenths of a millimeter. Thus, a machining removal of the burr is no longer necessary.

In particular implementations, the recess produced with the laser beam is introduced into the workpiece with a maximum size, the enveloping circle of the recess being smaller than the final dimensions of the borehole. As a result, there can be a homogenous peripheral outer surface of the borehole across the entire wall thickness of the workpiece.

In some implementations, after introducing the borehole, a thread is introduced by a thread cutting tool or a thread-shaping tool. The thread cutting or thread shaping can be selected depending on the materials used for the workpiece. For example, with a workpiece made of construction steel, a thread cutting tool can be used. With high strength construction steels or even with thicker wall thicknesses, a thread shaping tool can be used.

In particular implementations, a recess having parallel, tapering, or widening wall sections that border the recess is introduced into the workpiece by the laser beam. As a result, further specific requirements can be met. As a result of a processing machine having a pendulum axis for the processing head, various flank pitches for the wall sections can be introduced in the recess.

In certain implementations, the recess is produced by the laser beam with a polygonal contour or a non-round contour. This also enables the shape and geometry of the recess to be adjusted to the introduction location on the workpiece. In particular with tubes, because of the curvature of the outer surface, a recess in one direction can have a preferred direction, which is greater than in the other direction.

The contour of the recess and/or the flank pitch of the wall section of the workpiece, said wall section bordering the recess, can be selected and adjusted depending on the topography. In particular, the contour of the recess and/or the flank pitch of the wall section bordering the recess is dependent on the surface curvature of the workpiece to be processed. As a result, a further reduction of the axial forces when processing the recess to a final dimension or when finishing the recess can be achieved.

In certain implementations, the plate-shaped workpiece, into which the recess and the borehole are to be introduced, can be processed in a punching laser processing machine having a flatbed as the workpiece support surface.

In particular implementations, a rod-shaped or tubular workpiece is processed in a laser tube cutting machine having a roller supply for the rod-shaped or tubular workpiece as the workpiece support and a feed-through chuck for guiding the workpiece.

Furthermore, in some implementations, opposing wall sections of the recess have a different flank pitch and/or a different distance from one another in a feed direction than the opposing wall sections of the recess in a rotational direction of the laser tube cutting machine. As a result, the positional accuracy of the borehole can be improved, and wear of the tool can be further reduced.

In another aspect, the disclosure provides processing machines, in particular for carrying out the methods described herein. The processing machines include a moveable tool receiver provided in a processing region of a processing head of the laser processing device or adjacent to this processing head, which emits a laser beam and directs it towards the workpiece to be processed, wherein the processing head can be moved into a processing position relative to the workpiece for a subsequent processing, to process a recess introduced by the laser beam. As a result, the workpiece can be processed by a clamping operation, i.e., firstly the recess is introduced and then the borehole is finished to a final dimension. As a result of maintaining the clamping operation, a high degree of positional accuracy and thus precision in terms of the introduction of the borehole can be achieved.

The tool receiver is received by a guide that is moveable at least in one axis and can be positioned relative to the processing position. Depending on the available installation space or the requirements, a single-axis or multi-axis system can be provided.

In some implementations, the tool receiver can be moved between a processing position relative to the workpiece and a magazine that is provided for storing several tools.

In particular implementations, the processing machine is formed as a punching laser processing machine having a flatbed for receiving the plate-shaped material to be processed. By providing a flow drill in a magazine, a borehole can be processed to a final dimension into the plate-shaped material by means of the tool receiver after the introduction of the receiver.

The processing machines can also be provided as laser tube cutting machines having a workpiece support formed as a rolling support for supplying the rod-shaped, in particular tubular, workpieces, which are guided through a feed-through device to a processing space, wherein, adjacently to the processing head or in a processing space, a workpiece receiver is provided adjoining the feed-through device, said workpiece receiver being opposite the workpiece support. As a result, in turn, the introduction of the receiver and subsequently the introduction of the borehole can take place by clamping of the rod-shaped workpiece. Here, the introduction of the recess and the production of the final dimension of the borehole take place with the flow drill from the same processing direction. Alternatively, it can also be provided that the rod-shaped material is rotated after the introduction of the recess by means of the laser beam, for example, by a few angular degrees, in particular 90°, such that thereupon, the borehole is processed to a final dimension by an infeed motion of the workpiece receiver by means of the flow drill.

DESCRIPTION OF DRAWINGS

The invention and other advantageous embodiments and developments thereof are described and explained in more detail below by means of the examples depicted in the drawings. The features that can be seen in the description and the drawings can each be applied individually or several in any combination according to the invention. Here are shown.

DETAILED DESCRIPTION

Figure 1:
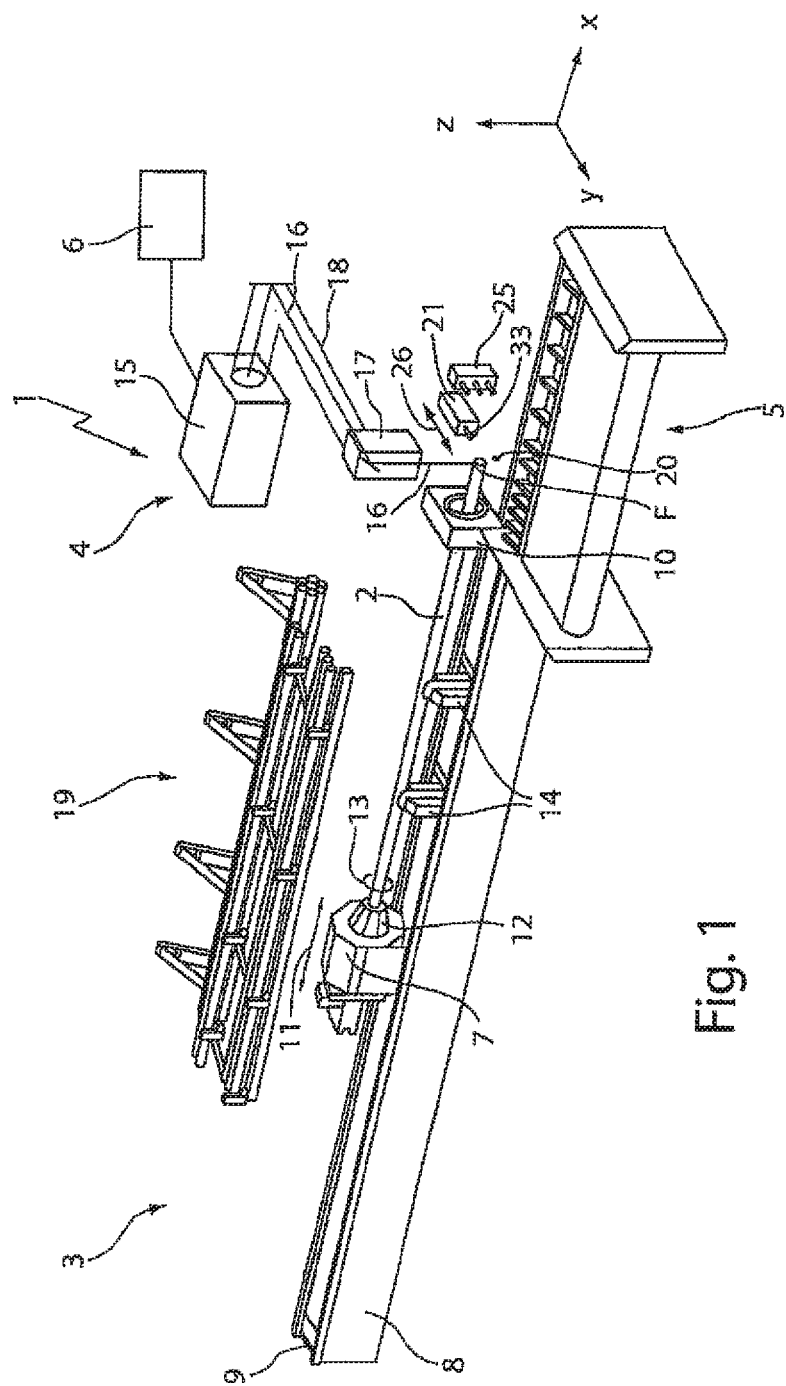
FIG. 1 is a perspective view of a first embodiment of the processing machine having a laser processing device.

FIG. 1 shows a schematically simplified laser processing machine 1, which is provided for the cutting processing of workpieces 2, wherein the workpieces 2 are formed to be rod-shaped, in particular tubular. Rod-shaped is, however, also to be understood as profiles. This laser processing machine 1 comprises a supply device 3 for laterally supplying the workpiece 2 to be cut to the laser processing machine 1, for example by a loading device 19. This supply device 3 supplies the workpiece 2 to be processed to a processing device 4 for the laser cutting of the workpiece 2, in particular of rod sections or tube parts. These are received via an unloading device 5 and removed from the laser processing machine 1. All essential functions of the laser processing machine 1 are controlled by a numerical control device 6.

The supply device 3 comprises a rotational and feed device that serves as a workpiece movement device 7, and a machine bed 8 having guiding rails 9 and a feed-through device 10. The workpiece movement device 7 is motor driven and can be moved in the feed direction 11 on the guiding rails 9. The workpiece 2 is fixed with a clamping device 12 of the workpiece movement device 7, which can be rotated in the direction of the double arrow 13 and encompasses the supplied workpiece 2 from the outside and fixedly clamps it. The rod-shaped workpiece 2 is supported by at least one workpiece support 14 integrated in the machine bed 8 during the supply of the workpiece 2 to the feed-through device 10 and/or during the processing of the workpiece 2. In the region of the processing device 4, the workpiece 2 is guided through the feed-through device 10, which supports the workpiece 2. The feed-through device 10 is designed in such a way that the clamped workpiece 2 is guided in the feed direction and not fixedly clamped. The rod-shaped workpiece 2 can be rotated in the feed-through direction 10 around an axis of rotation.

The processing device 4 includes a laser beam source 15 for generating a laser beam 16, a processing head 17 and a beam guide 18, which guides the laser beam 16 from the laser beam source 15 to the processing head 17. The laser beam 16 emerges from the processing head 17 and, at a processing point F inside a processing space 20, the laser beam 16 is focused on an outer peripheral face of the rod-shaped workpiece 2.

A tool receiver 21 is provided in the processing space 20 and/or adjacent to the processing head 17. The tool receiver 21 can be moved by means of a guide 22 (FIG. 2) at least inside the processing space 20, such that the tool receiver 21 having a tool 33 clamped therein can be moved relative to the processing point F and, in turn, can be removed away from the processing point F.

Furthermore, a magazine 25 is provided removed from the processing point F. This magazine 25 can be formed, for example, as a linear magazine or revolver magazine. Various tools 33, such as drills, flow drills, thread cutting tools or thread shaping tools, for example, can be stored in this magazine 25. The tool receiver 21 can be moved at least between the magazine 25 and the processing point F in the Y-direction according to the double arrow 26 depicted. To use a linear magazine 25, the tool receiver 21 can also be moved in the Z-direction along the double arrow 27.

On the side of the feed-through device 10 that faces away from the machine bed 8, the unloading device 5 is provided, which removes workpiece parts or sections that have been cut from the rod-shaped workpiece 2 and a remaining workpiece from the laser processing machine 1.

Figure 2:
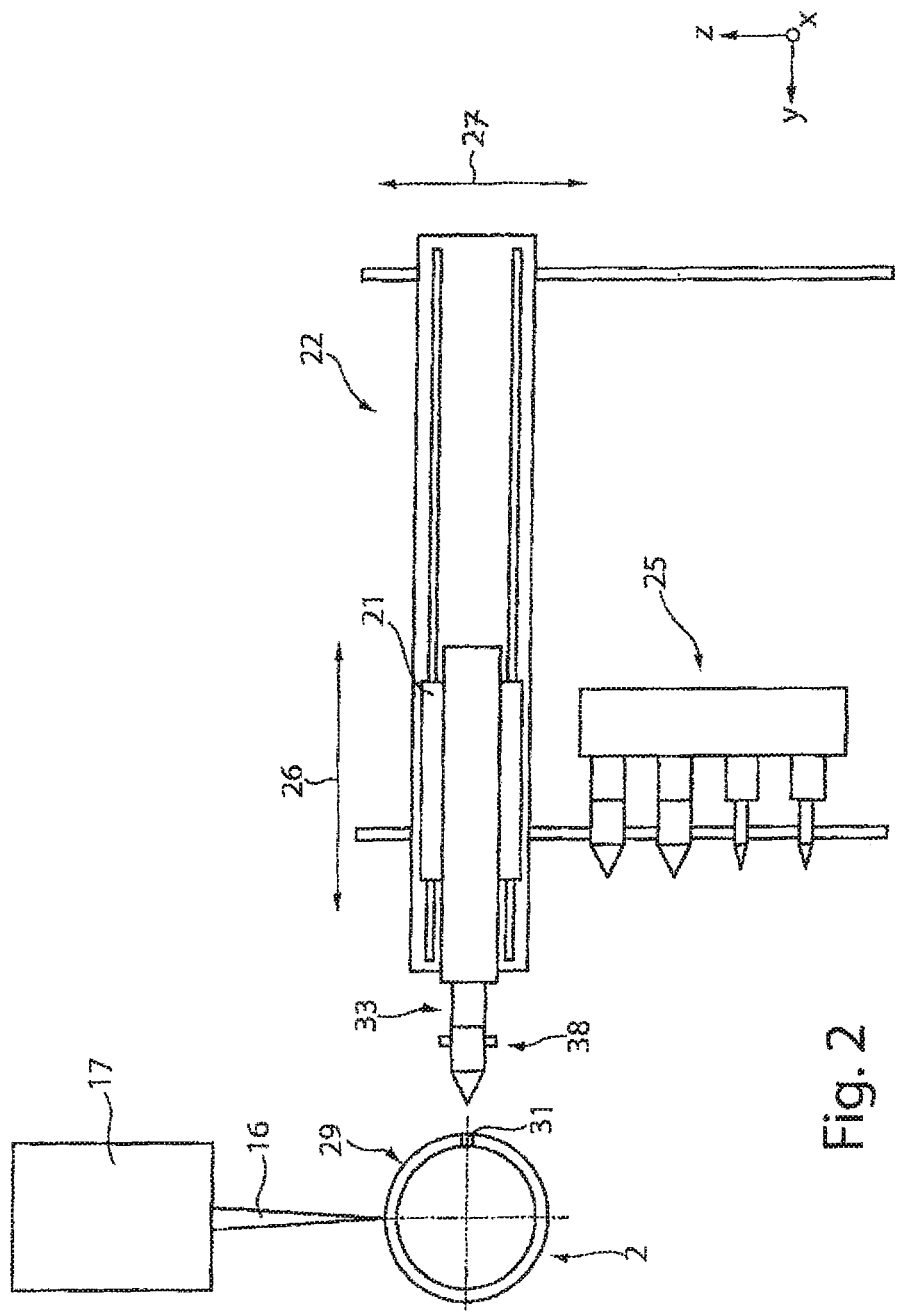
FIG. 2 is a schematic side view of a processing space of the laser processing machine according to FIG. 1.

A schematic side view into the processing space 20 of the laser processing machine 1 is depicted in FIG. 2 in a schematically simplified manner. The processing head 12 is aligned onto a workpiece 2, for example a tube, said processing head 12 being provided perpendicularly above the workpiece 2, for example. A recess 31 is introduced into a wall 29 of the tubular workpiece 2 by means of a laser beam 16 aligned onto the workpiece 2. For example, the tool receiver 21 is aligned offset by 90° relative to the processing head 17. The tool receiver 21 is moveably received along a Y-axis and a Z-axis of the guide 22, for example. The tool receiver 21 receives a flow drill 33. The tubular workpiece has been rotated by 90° by the tool piece movement device 7 for processing the recess 31. Depending on the positioning of the tool receiver 21 along the X-axis relative to the processing head 17, yet another shifting movement of the workpiece 2 can be additionally controlled by the workpiece movement device, such that the recess 31 is aligned to be flush to a longitudinal axis of the flow drill 33, which is held by the workpiece receiver 21. Starting from this position depicted in FIG. 2, the recess 31 is widened by means of a feed movement of the tool receiver 21 in the direction of the workpiece 2, and a borehole 34 is processed with the flow drill 33 to a final dimension, as is described in more detail below in FIG. 6.

The magazine 25 is schematically depicted adjacent to the tool receiver 21, which can receive various tools.

The tool receiver 21 can be arranged on a single-axis or multi-axis linear guide or on a different handling device. In the X-direction, the tool receiver 21 is positioned as close as possible to the feed-through device 10, such that the pressing force of the flow drill 33 exerts as low a lever force as possible on the rod-shaped workpiece 2. The feed-through device 10 can better support the workpiece 2 in the Y-direction than the workpiece receivers 14 can. When mounting the tool receiver 21 next to the processing head 17 with a feed direction in the Z-direction, a support of the workpiece 2 to be processed by the workpiece receiver 14 would be sufficient, and the feed-through device 10 would not be necessary. Similarly, in certain implementations, the workpiece support 14 can be employed in such a way that there is sufficient support in the Y-direction and the feed-through 10 can be left out.

Figure 3:
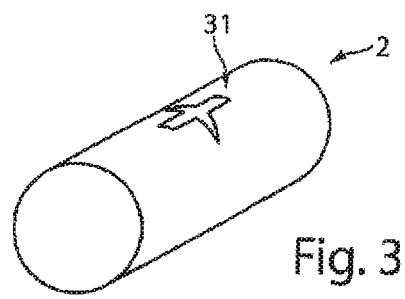
FIG. 3 is a perspective view of a rod-shaped workpiece having a recess that has been introduced.

In FIG. 3, a rod-shaped workpiece 2 is depicted in perspective. A recess 31 is introduced into this workpiece 2. The recess 31 has a polygonal contour. For example, this is adjusted to the surface curvature of the workpiece 2, wherein a larger wall section, for example, has been cut out along the longitudinal axis than in the radial extension direction. Here, any polygonal or even oval shapes are possible. As a result of the production of the recess 31 by means of the laser beam 16, such varied recesses 31 that are adjusted to the geometry of the workpiece 2 can be introduced. This has the advantage that, as a result of the subsequent widening of the recess 31 to a final dimension of the borehole 34, reduced axial forces, which act on the workpiece 2 through the borehole 33, have to be received.

Figure 4A:
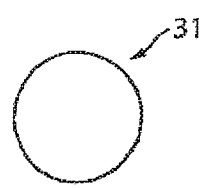
FIGS. 4A-4F show schematic views of various contours of the recess.
Figure 4B:
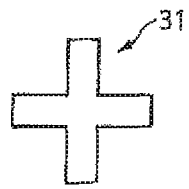
Figure 4C:
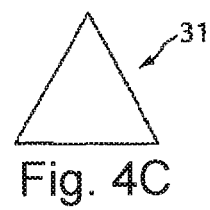
Figure 4D:
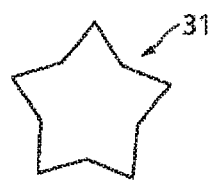
Figure 4E:
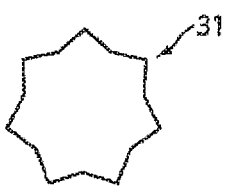
Figure 4F:
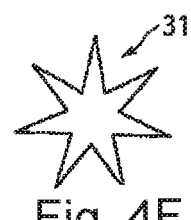

In FIGS. 4A-4F, various contours of the recess 31 are depicted. For example, FIG. 4A shows a round contour of the recess 31. The further FIGS. 4B to f show polygonal contours. FIG. 4B shows a cross-shaped recess 31, FIG. 4C a triangular recess 31, FIG. 4D-4F various star-shaped recesses 31.

With radially symmetrical recesses 31, odd-numbered radially symmetrical recesses 31, as depicted in FIG. 4C-4F, are employed in certain implementations because the smooth running of the flow hole drill when producing the borehole 34 can be thereby improved.

As a result of the introduction of the recess 31 as a preparation step for the production of the borehole 34 to an end dimension, a precise alignment of the recess into the workpiece 2 can furthermore be made possible because of the use of a laser beam.

Figure 5A:
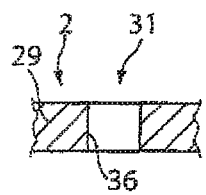
FIGS. 5A-5C illustrate schematic sectional views of various alignments of wall sections of the recess.
Figure 5B:
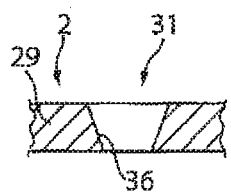
Figure 5C:
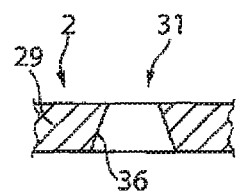

In FIG. 5A, the wall sections 36 are aligned in parallel or a straight recess 31 is formed. In FIG. 5B, a tapering course of the opposite wall sections 36 is depicted and, in FIG. 5C, a widening or expanding course of the wall sections 36 is depicted, which can be generated by laser cutting when introducing a recess 31. As a result of a suitable choice of the wall course, the recess 31 can be further adjusted to the topography of the workpiece 2. It is also possible that the flank pitch of the wall course varies along the periphery of the recess 31.

Figure 6:
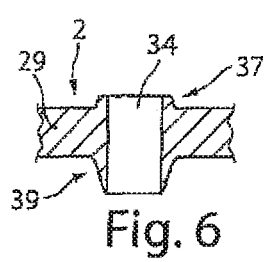
FIG. 6 is a schematic sectional view of a borehole produced to a final dimension in the workpiece.

In FIG. 6, a schematic sectional view of a borehole 34 is depicted in which the recess 31 has been introduced in a first step by means of the laser beam 16, said recess 31 having a smaller enveloping circle than the final dimension of the borehole 34. Then, the borehole 34 is formed by the flow drill 33, wherein a burr 37 is formed by the flow drill 33 during the production of the borehole 34. As a result of a bundled coil 38 on the drill hole 33 (FIG. 2), this burr 37 can have a defined contour, such that an outside of the workpiece 2 is produced with a defined contour. The height of the burr 37 can also be influenced by the geometry of the borehole 34. Thus, the burr 37 is smaller, e.g., the smaller of the difference between the enveloping circle of the recess 31 and the borehole 34. Furthermore, the height of the burr 37 can be reduced by a recess 31 having a tapering course of the recess wall 36 when the embodiment according to FIG. 5B is chosen.

A collar 39 is formed opposite the burr 37 by flow drilling. The length of the collar 39 depends on the material to be displaced because of the difference of the measurement of the recess 31 and the final dimension of the borehole 34 and can thus be set by a suitable choice of the geometry of the recess 31.

In particular with thin-walled workpieces 2, i.e. both with rod-shaped, in particular with tubular workpieces, and also with plate-shaped workpieces, the production of the borehole 34 by flow-drilling has the advantage that a borehole 34 that is extended in comparison to the wall thickness of the workpiece 2 is formed. As a result, there can be an improved reception of an inserted object.

Figure 7:
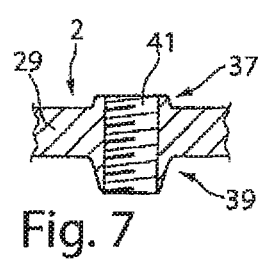
FIG. 7 is a schematic sectional depiction of a thread in the workpiece introduced into the borehole according to FIG. 6.

Furthermore, the length of a thread 41 to be produced, such as is depicted in FIG. 7, can be enlarged in comparison to the wall thickness of the workpiece 2, whereby there is an increased fixing force. The thread 41 according to FIG. 7 can be introduced into the borehole 34 both by a thread cutting tool and by a thread forming tool.

Figure 8:
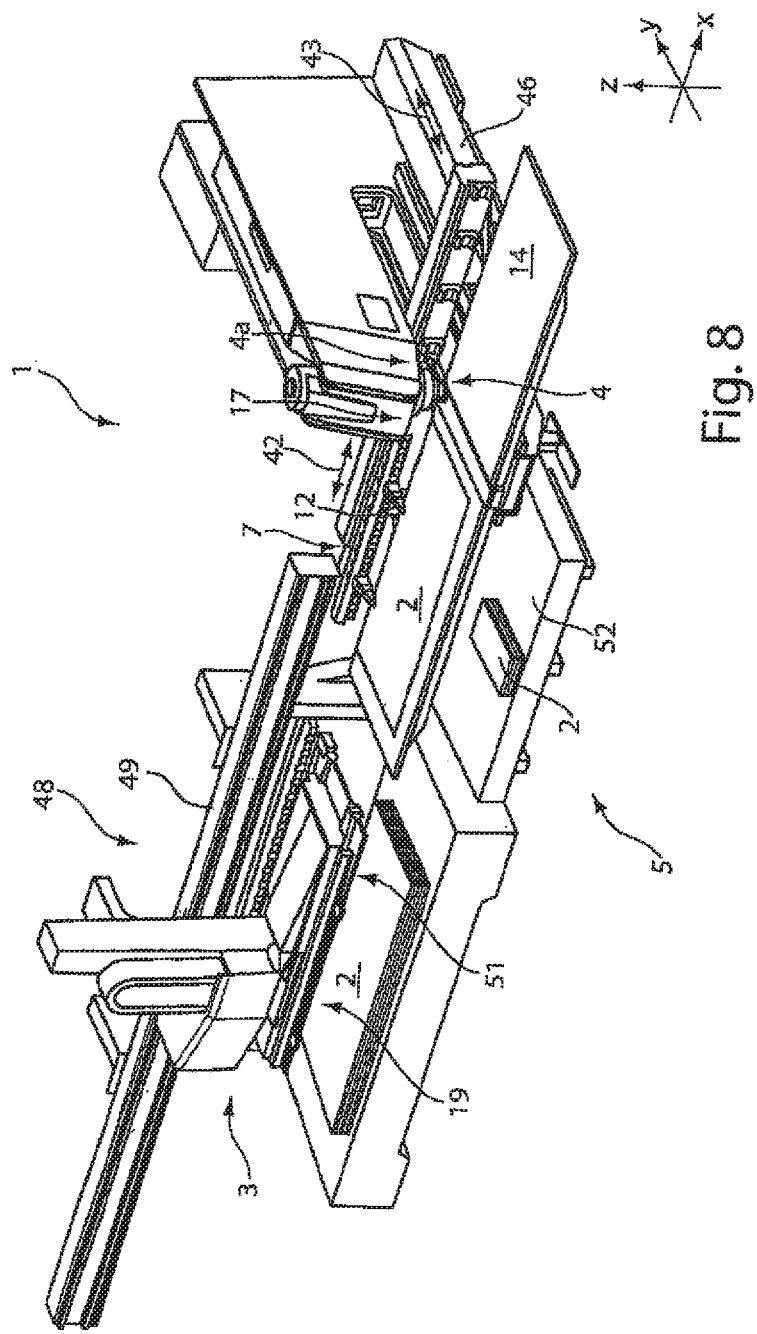
FIG. 8 is a perspective view of an alternative processing machine to FIG. 1.

In FIG. 8, an alternative embodiment of the laser processing machine 1 to that of FIG. 1 is depicted. This laser processing machine 1 is provided for the processing of plate-shaped workpieces 2. Here, it is a so-called flatbed laser punching processing machine.

This laser processing machine 1 has a fixed laser processing device 4, which receives the processing head 17 for guiding the laser beam 16 and a punching head 44. The plate-shaped workpiece 2 to be processed rests on a workpiece support 14, in particular a flat workpiece support 14. The workpiece 2 is held by a workpiece movement device during the processing, which is motorically driven and controls a travelling movement of the plate-shaped workpiece 2 in the plane of the workpiece support 14 and relative to the processing head 17 and/or punching head 44. To do so, the clamping device 12 is provided in the form of clamps. The plate-shaped material or workpiece 2 is moved according to the double arrow 42 and against the X-direction by the workpiece movement device 7. The workpiece support 14 can be moved relative to a base frame 46 according to the double arrow 43 and against the Y-direction; the workpiece movement device 7 is here shifted with it too. A processing region or a processing space 20 lies between the punching head 44 and a punching die, which is not depicted in more detail and which is allocated to the punching head 44. Both the punching head 44 and the punching die can be exchanged.

A handling device is allocated to the workpiece support 14 of the processing machine 1 on an end face, said handling device 48 comprising a supply device 3, by means of which the plate-shaped material is removed from a loading device 19 and supplied to the processing machine 1 via a linear axis 49. This supply device 3 can serve as a removal device to remove the processed plate-shaped workpiece(s) 2 from the workpiece support 14 and depositing it or them in an unloading device 5. The unloading device 5 can comprise a magazine 52, for example, in which the processed workpieces 2 are deposited by means of the handling device 48.

In a magazine for tools and/or tool holders, which is provided inside the processing device 4, the tool receiver 21 can be provided, such that a flow drill 33 can be received by exchanging the punching head 44 with the tool receiver 21 and can be supplied to the processing point F. In this embodiment, it is provided that the laser beam 16 and the tool receiver 21, in particular the flow drill 22, are aligned in parallel with relation to its longitudinal axis and adjacent to each other, such that the processing direction is the same. As a result of a travelling movement of the workpiece movement device 7, the plate-shaped workpiece 2 is moved after the introduction of the recess 31 by the laser beam 31 to the workpiece receiver, such that then the flow drill 33 can be introduced into the recess 31 and the borehole 34 can be produced.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for processing a plate-shaped workpiece or rod-shaped workpiece in a processing machine having a laser processing device, the method comprising:
   moving at least one of the workpiece and a processing head for a laser beam with respect to one another;
   directing the laser beam towards the workpiece using the processing head;
   forming a recess in the workpiece using the laser beam, wherein the recess is formed by the laser beam to have at least one of parallel, tapering, and widening wall sections bordering the recess, wherein the recess has at least one of a polygonal contour and a non-round contour; and
   widening the recess formed by the laser beam to an enlarged borehole using a flow drill.

2. The method of claim 1, wherein the recess introduced into the workpiece by the laser beam comprises a maximum size, and wherein an enveloping circle of the recess is smaller than a final dimension of the borehole formed by the flow drill.

3. The method of claim 1, further comprising introducing a thread into the borehole by a thread cutting tool or a thread shaping tool.

4. The method of claim 1, further comprising adjusting a contour of the recess or a flank pitch of the wall sections bordering the recess, or both, to a topography of the workpiece to be processed.

5. The method of claim 1, further comprising adjusting a contour of the recess or a flank pitch of the wall sections bordering the recess, or both, to a surface of curvature of the workpiece to be processed.

6. The method of claim 1, wherein the plate-shaped workpiece is processed in a punching laser processing machine comprising a workpiece support formed as a flatbed.

7. The method of claim 1, wherein the rod-shaped workpiece is processed in a laser tube cutting machine comprising a feed-through device supporting the workpiece.

8. The method of claim 7, wherein opposite wall sections of the recess have at least one of a different flank pitch and a different distance to one another in a feed direction along a longitudinal axis of the laser tube cutting machine, than the opposite wall sections of the recess in a rotational direction of the laser tube cutting machine around the longitudinal axis.

* * * * *